United States Patent [19]

Wykhuis et al.

[11] Patent Number: 4,580,811
[45] Date of Patent: Apr. 8, 1986

[54] REAR COUNTERWEIGHT ASSEMBLY FOR A VEHICLE CARRYING A FRONT MOUNTED IMPLEMENT

[75] Inventors: Lloyd A. Wykhuis, Mayville; Peter F. Brautigam, Kewaskum, both of Wis.

[73] Assignee: Deere & Company, Moline, Ill.

[21] Appl. No.: 556,762

[22] Filed: Dec. 1, 1983

[51] Int. Cl.⁴ ................... B62D 37/00; B60K 5/02
[52] U.S. Cl. ............................ 280/759; 293/136
[58] Field of Search ................... 280/759; 293/136

[56] References Cited

U.S. PATENT DOCUMENTS

| | | | |
|---|---|---|---|
| 3,032,352 | 5/1962 | Barrett | 280/759 |
| 3,490,787 | 1/1970 | Latterman et al. | 280/759 |
| 3,517,941 | 6/1970 | Lazzeronu | 280/759 |
| 3,888,507 | 6/1975 | Berghausen | 280/759 |
| 4,067,415 | 1/1978 | Samide | 280/759 |
| 4,151,921 | 5/1979 | Myers et al. | 280/759 |
| 4,232,883 | 11/1980 | Bourgeous et al. | 280/759 |
| 4,460,205 | 7/1984 | Glance | 293/136 |
| 4,471,975 | 9/1984 | Sorlie et al. | 280/759 |

Primary Examiner—Richard A. Bertsch

[57] ABSTRACT

A counterweight assembly is mounted at the rear end of a vehicle adapted for having an implement mounted to its forward end. The counterweight assembly is incorporated into a rear bumper assembly and includes rectangular weights having notched lower edges received on a pair of transversely spaced bumper mounting rods. The mounting rods are received in holes provided in a rear cross member of the vehicle frame and have nuts received on threaded forward ends.

4 Claims, 2 Drawing Figures

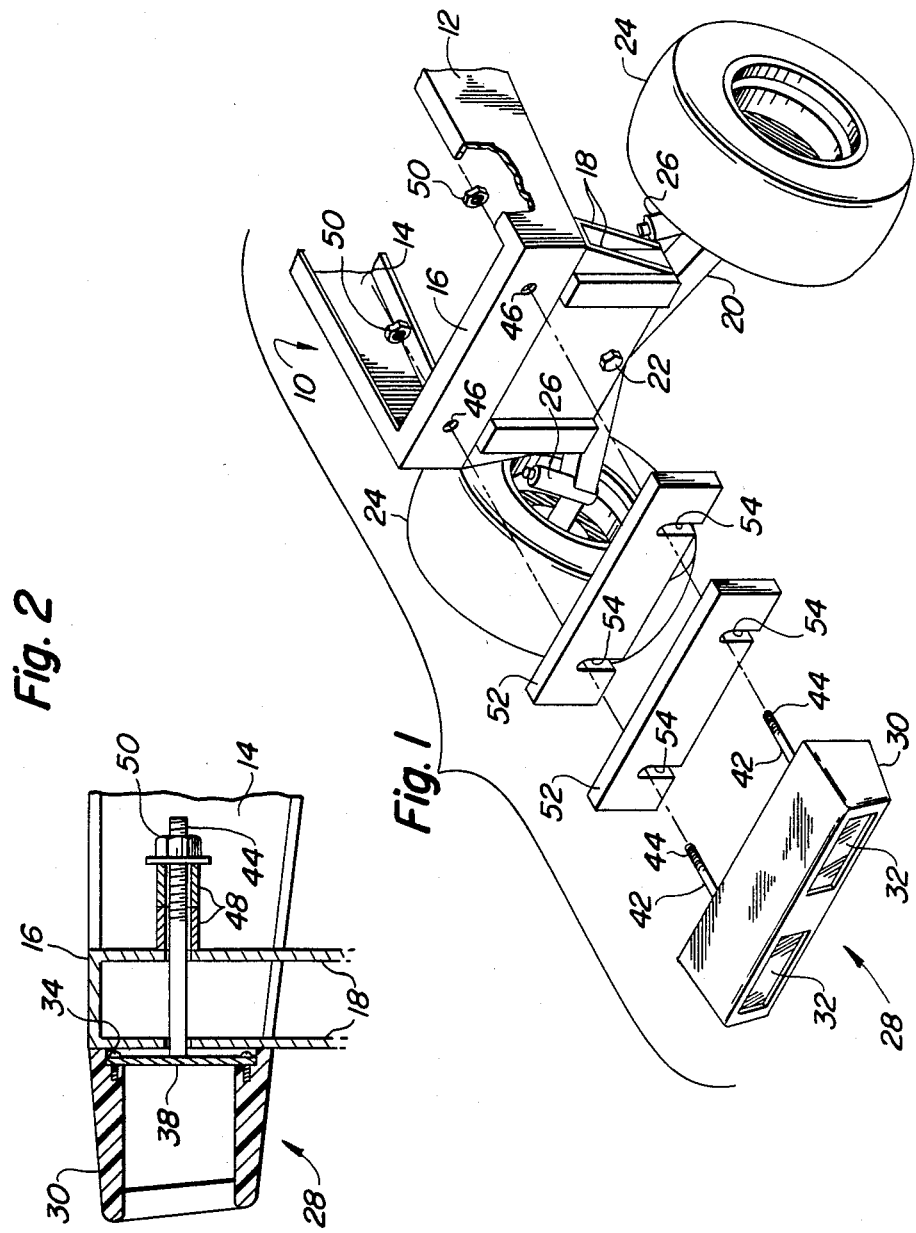

REAR COUNTERWEIGHT ASSEMBLY FOR A VEHICLE CARRYING A FRONT MOUNTED IMPLEMENT

BACKGROUND OF THE INVENTION

The present invention relates to a counterweight assembly for a vehicle and more particularly relates to a rear counterweight assembly for a vehicle especially constructed for carrying an implement, such as a mower for example, at its forward end.

The prior art is replete with various counterweight assemblies; however, most include an add-on support frame or other components. U.S. Pat. No. 4,232,883 issued on Nov. 11, 1983 is an example of the prior art.

Now there is provided a counterweight assembly which makes use of existing framework for supporting the counterweights while requiring only a minimum of additional attaching hardware.

SUMMARY OF THE INVENTION

According to the present invention there is provided an improved counterweight assembly for a vehicle.

An object of the invention is to provide a counterweight assembly which makes use of existent framework for supporting the weights.

A further object is to provide a counterweight assembly which does not hinder the function of the vehicle nor disturb the styling lines thereof.

A more specific object of the invention is to provide a bumper mount which also serves to support counterweights.

Another object of the invention is to provide a counterweight assembly which utilizes a frame member that also supports an axle assembly.

These and other objects will become apparent from a reading of the ensuing description together with the appended drawing.

BRIEF DESCRIPTION OF THE DRAWING

FIG. 1 is an exploded right rear perspective view of the rear end portion of a vehicle adapted for carrying a mower at its forward end and showing the counterweight assembly of the present invention.

FIG. 2 is a vertical sectional view taken through one of the mounting rods of the bumper assembly secured to the vehicle frame.

DESCRIPTION OF THE PREFERRED EMBODIMENT

Referring now to the drawing, there is shown the rear end portion of a vehicle 10 which may be adapted for carrying a mower at its forward end, for example.

The vehicle 10 includes a main frame including right- and left-hand frame members 12 and 14, respectively, joined at their rear ends by a cross member 16. The cross member 16 includes a pair of fore-and-aft spaced depending plates 18 to which an axle member 20 is coupled by a fore-and-aft extending pivot pin 22. Steerable wheels 24 are swivelly supported at opposite ends of the axle 20 in king pin assemblies 26. The system for effecting steering of the wheels 24 is not shown here but may be of a conventional type employing a hydraulic steering actuator, for example.

A bumper assembly 28 is also coupled to the cross member 16. Specifically, the bumper assembly 28 comprises a bumper 30 formed of an elongate block of tough elastomeric material such as Surlyn or the like. The bumper 30 houses a pair of taillights having lenses 32 arranged side-by-side in respective openings which extend to a rear surface of the bumper. Received within a recess 34 formed in the forward face the bumper 30 is a rectangular bumper mounting plate 38. A plurality of screws secure the plate and bumper 30 together. Welded to the plate 38 is transversely spaced relationship to each other are first ends of a pair of bumper mounting rods 42 having threaded second ends 44. The rods 42 are received in holes 46 provided in the cross member 16. When no counterweights are used, as shown in FIG. 2, a plurality of spacers 48 are received on the rods 42 forwardly of the cross member 16 and nuts 50 are received on the rods 42 and thus act to hold the bumper 30 in place against the cross member 16.

Counterweight may be added to the rear end of the vehicle 10 in the form of rectangular weights 52 having transversely spaced notches 54 in a lower edge thereof. As can best be seen in FIG. 1, the weights 52 are located between the vehicle cross member 16 and the bumper mounting plate 38 with their notches 54 receiving the bumper mounting rods 42. It will be noted that with the weights 52 in place there is no need for the spacers 48 and they are merely stored in a toolbox or the like until needed. Also, it is noted that the weights 52 are dimensioned so as to have a height equal to that of the forward ends of the frame members 12 and 14 and the rear side of the bumper 30 and a length equal to the distance between the outer faces of the frame members 12 and 14 and the length of the bumper 30. Therefore, the weights 52 conform to the styling of the rear end of the vehicle 10.

We claim:

1. In combination with a vehicle having a rearward end defined in part by a frame including a pair of side members having rear ends joined by a cross member and a bumper releasably secured to the cross member; a counterweight assembly comprising: said bumper being formed of a tough elastomeric material defining opening means extending fore-and-aft therethrough; said bumper having a forward end provided with a rectangular recess surrounding said opening means; said opening means being adapted for receiving a taillight means and having a rearward end closed by a taillight lens means; a bumper mounting structure including a pair of transversely spaced, forwardly projecting mounting rods having forward threaded ends and a rectangular plate fixed to the rear ends thereof and releasably secured in said recess in closing relationship to a forward end of said opening means; a pair of transversely spaced openings located in the cross member and respectively receiving the mounting rods; at least one rectangular weight having a lower edge provided with a pair of transversely spaced upwardly extending notches; said at least one weight being located between said bumper and said cross member with the notches thereof received on said mounting rods; and a pair of threaded nuts respectively received on said pair of mounting rods and holding said at least one weight sandwiched between said bumper and cross member.

2. The combination defined in claim 1 wherein said weight and forward end of said bumper are dimensioned so as to be equal in height to a rear end of said side members.

3. The combination defined in claim 1 wherein said opening means are a pair of side-by-side cavities; said cavities being closed at respective rearward ends by a pair of taillight lenses defining said lens means and closed at respective forward ends by said plate.

4. The combination defined in claim 1 wherein said cross member includes a central depending portion; and an axle being mounted to said depending portion for movement about a fore-and-aft extending axis.

* * * * *